Patented Oct. 9, 1934

1,976,145

UNITED STATES PATENT OFFICE 1,976,145

2-HYDROXYANTHRACENE-3-CARBOXYLIC ACID AND A PROCESS OF PREPARING IT

Ludwig Sander, Frankfort-on-the-Main, and Sebastian Gassner, Leverkusen, Germany, assignors to General Aniline Works, Inc., New York, N. Y., a corporation of Delaware No Drawing. Application July 17, 1931, Serial No. 551,556. In Germany August 2, 1930

4 Claims. (Cl. 260—110)

Our present invention relates to 2-hydroxyanthracene-3-carboxylic acid and to a process of preparing it.

We have found that the hitherto unknown 2-hydroxyanthracene-3-carboxylic acid of the formula:

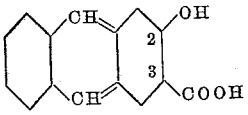

may be made with good yield by reducing an anthraquinone compound of the following general formula:

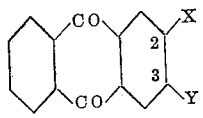

wherein X stands for halogen and Y represents a substituent of the group consisting of —COOH and —CN, to the corresponding anthracene compound and replacing the halogen standing in the 2-position in the latter by the hydroxy group, for example, by treating the latter with an alkaline agent while heating. If a 2-halogen-3-cyano compound is used as starting material, then besides the replacement of the halogen atom by the hydroxy group, the cyano group in 3-position is transformed to the carboxylic acid group by the treatment with an alkaline agent.

The process of preparing the new compound may also be carried out by first treating the anthraquinone compound of the above formula with an alkaline agent and then reducing the thus obtained 2-hydroxyanthraquinone-3-carboxylic acid to the corresponding anthracene compound. The two steps may be carried out in either order.

It could not be expected that the said reactions would take place in the above stated manner: It was rather possible that the reduction would yield only anthranol compounds, or that the reaction would not stop with the formation of the anthracene compound, but would proceed and yield hydrogenated anthracene compounds. Above all it could be assumed that by the action of the reducing agent the halogen atom in the 2-position would be eliminated and/or the carboxylic acid group in the 3-position be split off.

Furthermore, it was possible that the treatment of the 2-halogen-anthraquinone-3-carboxylic acid, or of the 2-halogen-anthraquinone-3-nitrile would cause the splitting off of the carboxylic acid group or even the cleavage of the anthraquinone nucleus.

The 2-hydroxyanthracene-3-carboxylic acid is a suitable intermediate product for the manufacture of dyestuffs.

The following examples serve to illustrate the invention, but they are not intended to limit it thereto, the parts being by weight unless otherwise stated:

(1) 55 parts of 2-chloroanthraquinone-3-carboxylic acid (obtainable, for instance, according to Heller and Schuelke, Berichte der deutschen chemischen Gesellschaft, vol. 41, page 3638) are mixed with 1000 parts by volume of ammonia of 12 per cent strength. In the course of 4 hours and while adding 250 parts of zinc dust in small amounts, the temperature is slowly raised until the reaction mixture boils gently (about 100° C.). The reduction is nearly finished when the color of the solution, which is at first blood-red, has become light reddish-yellow. Thereupon the solution is heated to boiling for further half an hour. The 2-chloro-anthracene-3-carboxylic acid thus obtained is separated from the zinc sludge by completely extracting the reaction mixture with hot water. The 2-chloroanthracene-3-carboxylic acid is precipitated from the ammoniacal extract at boiling temperature by means of a dilute mineral acid.

The compound can be sublimed with only slight decomposition; it crystallizes from dioxane in the form of uniform yellow leaflets, melting at 285° C. Solutions of the acid in alkalies are colorless; neutral or acid solutions have a yellow color. The solutions show the fluorescence which is characteristic of anthracene compounds.

10 parts of 2-chloroanthracene-3-carboxylic acid are heated at about 200° C.–210° C., for 5–6 hours with 150 parts of a caustic potash solution of 15 per cent strength in a copper-plated autoclave provided with a stirrer. The deep reddish-yellow solution thus obtained may be freed from suspended impurities by filtering it. The reaction product is precipitated from the filtrate at boiling temperature by means of an excess of a dilute mineral acid. The 2-hydroxyanthracene-3-carboxylic acid separates in the form of reddish-yellow flakes and is filtered by suction, washed and dried. The new compound is obtained in a very good yield.

By causing a solution of the compound in dioxane to evaporate slowly, the 2-hydroxyanthracene-3-carboxylic acid is obtained in the form of reddish-yellow leaflets, melting after sintering and decomposition at about 300° C.

(2) 120 parts of 2-bromo-3-cyano-anthraquinone (obtainable from 2-bromo-3-amino-anthraquinone by diazotizing and converting the diazo compound by means of cuprous cyanide according to Sandmeyer) are heated to 180° C. for 6 hours with 160 parts of potassium carbonate, 35 parts of sodium acetate and 0.6 part of copper powder in 2000 parts of water, whereby the cyano group is saponified into the carboxylic acid group and the bromine in 2-position is replaced by the hydroxyl group. After cooling, the potassium salt of the 2-hydroxyanthraquinone-3-carboxylic acid which has been crystallized out is filtered off and the free acid is isolated by decomposition with hydrochloric acid. After recrystallization from nitrobenzene the free acid is obtained in the form of yellow needles melting at 308° C.–311° C.

Instead of potassium carbonate there may also be used other alkalies such as, for instance, caustic soda or caustic potash.

50 parts of 2-hydroxy-anthraquinone-3-carboxylic acid are heated to 90° C. for 2 hours with 500 parts of water, 100 parts of ammonia of 30 per cent strength and 10 parts of zinc dust. The whole is then filtered and, by addition of hydrochloric acid, the free acid is precipitated. It is identical with that obtained according to Example 1.

(3) 15 parts of potassium salt of the 2-chloro-anthracene-3-carboxylic acid obtainable according to Example 1 are heated in a nickel-plated autoclave at about 160° C.–170° C. for 7 hours with 600 parts of water, 9 parts of potassium carbonate and 0.3 part of copper sulfate dissolved in a small quantity of water.

The hot reaction product, if necessary, may be freed from suspended impurities by filtering by suction. The 2-hydroxyanthracene-3-carboxylic acid is subsequently precipitated from the filtrate by means of an excess of a dilute mineral acid. The reaction product is filtered by suction, washed and dried and there are obtained about 11.4 parts of 2-hydroxyanthracene-3-carboxylic acid which may be further purified by recrystallization.

(4) The 2-hydroxyanthracene-3-carboxylic acid is obtained with the same yield by effecting the reaction of the 2-chloroanthracene-3-carboxylic acid instead of in a nickel-plated autoclave as used in Example 2 in a silver-plated autoclave and by using instead of the copper sulfate, silver acetate as catalyst.

Instead of caustic potash solution or potassium carbonate there may be used for the transformation of the 2-chloroanthracene-3-carboxylic acid to the 2-hydroxy compound caustic soda solution, sodium carbonate sodium bicarbonate or sodium acetate. In the claims following hereafter we have included these agents in the generic expression "an alkali metal alkaline agent".

We claim:

1. The process of preparing 2-hydroxyanthracene-3-carboxylic acid which comprises reducing an anthraquinone compound of the general formula:

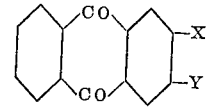

wherein X stands for halogen and Y represents a substituent of the group consisting of —COOH and —CN, to the corresponding anthracene compound and subjecting the latter to the action of an alkali metal alkaline agent while heating.

2. The process of preparing 2-hydroxyanthracene-3-carboxylic acid which comprises reducing 2-chloro-anthraquinone-3-carboxylic acid to 2-chloroanthracene-3-carboxylic acid and heating the latter with a solution of caustic alkali.

3. The process of preparing 2-hydroxyanthracene-3-carboxylic acid which comprises heating 2-chloro-anthraquinone-3-carboxylic acid with zinc dust and an aqueous solution of ammonia slowly to about 100° C. until the reaction mixture has become colorless, isolating the 2-chloro-anthracene-3-carboxylic acid formed and treating it with a dilute aqueous solution of caustic potash at about 200° C. to about 210° C.

4. As a new product, 2-hydroxyanthracene-3-carboxylic acid of the formula:

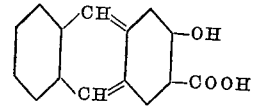

crystallizing from dioxane in the form of reddish-yellow leaflets, melting after sintering and decomposition at about 300° C.

LUDWIG SANDER.
SEBASTIAN GASSNER.